US012782292B2

(12) United States Patent
Tomita et al.

(10) Patent No.: US 12,782,292 B2
(45) Date of Patent: Nov. 3, 2026

(54) DIAGNOSIS METHOD, DIAGNOSIS DEVICE, AND PROGRAM

(71) Applicant: MITSUBISHI HEAVY INDUSTRIES, LTD., Tokyo (JP)

(72) Inventors: Tsuyoshi Tomita, Tokyo (JP); Yushi Iwata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 163 days.

(21) Appl. No.: 18/726,310

(22) PCT Filed: Nov. 15, 2022

(86) PCT No.: PCT/JP2022/042335
§ 371 (c)(1),
(2) Date: Jul. 2, 2024

(87) PCT Pub. No.: WO2023/153037
PCT Pub. Date: Aug. 17, 2023

(65) Prior Publication Data

US 2025/0067682 A1 Feb. 27, 2025

(30) Foreign Application Priority Data

Feb. 10, 2022 (JP) ................................ 2022-019481

(51) Int. Cl.
*G01N 21/88* (2006.01)
*G06T 7/90* (2017.01)
*G06V 10/56* (2022.01)

(52) U.S. Cl.
CPC ........... *G01N 21/8851* (2013.01); *G06T 7/90* (2017.01); *G06V 10/56* (2022.01)

(58) Field of Classification Search
CPC ...... G01N 21/88; G01N 21/8851; G06T 7/90; G06V 10/56
See application file for complete search history.

(56) References Cited

U.S. PATENT DOCUMENTS

2005/0170097 A1* 8/2005 Beauchamp .............. B08B 3/00 399/34
2007/0273765 A1* 11/2007 Wang ...................... G06T 7/254 348/152

(Continued)

FOREIGN PATENT DOCUMENTS

EP 2 607 890 6/2013
JP 2008-205188 9/2008

(Continued)

OTHER PUBLICATIONS

International Search Report issued Dec. 27, 2022 in International (PCT) Application No. PCT/JP2022/042335, with English-language Translation.

(Continued)

*Primary Examiner* — Thanh Luu
(74) *Attorney, Agent, or Firm* — Wenderoth, Lind & Ponack, L.L.P.

(57) ABSTRACT

Provided is a method for quantitatively diagnosing damage to TBC. A diagnosis method is a method for diagnosing a damage state of a coating material coated on a surface of a member and includes: a step of setting a diagnosis target portion in an image obtained by capturing the surface of the member; a step of specifying a reference portion in the image; a step of individually calculating L*a*b* values of the diagnosis target portion and the reference portion; a step of calculating a color difference between the L*a*b* values of the diagnosis target portion and the L*a*b* values of the reference portion; and a step of diagnosing the damage state of the diagnosis target portion from the color difference.

7 Claims, 5 Drawing Sheets

(56) References Cited

U.S. PATENT DOCUMENTS

| | | | |
|---|---|---|---|
| 2010/0177326 A1 | 7/2010 | Sakai et al. | |
| 2011/0239748 A1 | 10/2011 | Weon et al. | |
| 2012/0147397 A1 | 6/2012 | Kawamoto | |
| 2013/0297232 A1 | 11/2013 | Euler et al. | |
| 2014/0355016 A1* | 12/2014 | Kondo | H04N 1/4076 358/1.9 |
| 2015/0204778 A1 | 7/2015 | Kubiak | |
| 2019/0107499 A1 | 4/2019 | Ellis et al. | |
| 2021/0073970 A1 | 3/2021 | Afrasiabi et al. | |

FOREIGN PATENT DOCUMENTS

| | | |
|---|---|---|
| JP | 2011-220995 | 11/2011 |
| JP | 2012-137481 | 7/2012 |
| JP | 2014-503826 | 2/2014 |
| JP | 2015-155895 | 8/2015 |
| JP | 5831940 | 12/2015 |
| JP | 2017-264499 | 2/2017 |
| JP | 2018-95940 | 6/2018 |
| JP | 2018-128436 | 8/2018 |
| JP | 2019-108888 | 7/2019 |
| JP | 2021-99285 | 7/2021 |

OTHER PUBLICATIONS

Written Opinion Of The International Searching Authority issued Dec. 27, 2022 in International (PCT) Application No. PCT/JP2022/042335, with English-language Translation.

* cited by examiner

DIAGNOSIS METHOD, DIAGNOSIS DEVICE, AND PROGRAM

TECHNICAL FIELD

The present disclosure relates to a diagnosis method, a diagnosis device, and a program. The present disclosure claims priority based on JP 2022-019481 filed in Japan on Feb. 10, 2022, the contents of which are incorporated herein by reference.

BACKGROUND ART

A thermal barrier coating (TBC) is applied to a high-temperature member such as a rotor blade and a stator vane of a turbine to improve the thermal barrier properties and the durability of the high-temperature member. A damage such as peeling, cracking, chipping, and the like to the TBC may occur in an article to which the TBC is applied for various reasons. Since the damage to the TBC leads to the deterioration of the high-temperature member, whether the TBC is damaged is inspected in the manufacturing process of the article to which the TBC is applied. For example, chipping of the TBC is determined based on whether an undercoat is exposed or the like. At present, such a determination is made by visual sensory evaluation by an inspector. As a result, variations occur in pass/fail determinations by inspectors, which causes an inconsistency in the pass/fail determinations between inspectors or production sites, reworking, or the like, resulting in increase in costs.

In the related art, JP 2018-128436 A discloses a technique in which the roughness of a metal surface is quantified using a color difference calculated from an image obtained by capturing the metal surface, thereby evaluating the surface roughness. JP 2008-205188 A discloses a technique in which a transparent conductive film is irradiated with light, a color evaluation value of reflected light is measured, and a film thickness corresponding to the measured color evaluation value is obtained using film thickness characteristics information in which color evaluation values and film thicknesses are associated with each other.

The above notwithstanding, there is a need for a method of quantitatively diagnosing TBC damage that does not rely on the sense of an inspector.

The present disclosure provides such a diagnosis method, a diagnosis device, and a program that can solve the above-described problem.

Solution of the Invention

A diagnosis method according to the present disclosure is a method for diagnosing a damage state of a coating material coated on a surface of a member. The diagnosis method includes: a step of setting, in an image obtained by capturing the surface of the member, a diagnosis target portion that is a portion where the damage state is to be diagnosed; a step of designating, in the image, a reference portion that is a portion without the damage state; a step of individually calculating L*a*b* values of the diagnosis target portion and the reference portion; a step of calculating a color difference between the L*a*b* values of the diagnosis target portion and the L*a*b* values of the reference portion; and a step of diagnosing the damage state of the diagnosis target portion from the color difference.

A diagnosis device according to the present disclosure is a diagnosis device for diagnosing a damage state of a coating material coated on a surface of a member. The diagnosis device includes: a unit configured to set, in an image obtained by capturing the surface of the member, a diagnosis target portion that is a portion where the damage state is to be diagnosed; a unit configured to designate, in the image, a reference portion that is a portion without the damage state; a unit configured to individually calculate L*a*b* values of the diagnosis target portion and the reference portion; a unit configured to calculate a color difference between the L*a*b* values of the diagnosis target portion and the L*a*b* values of the reference portion; and a unit configured to diagnose the damage state of the diagnosis target portion from the color difference.

A program according to the present disclosure is a program for executing a diagnosis processing for diagnosing a damage state of a coating material coated on a surface of a member. The diagnosis processing includes: a step of setting, in an image obtained by capturing the surface of the member, a diagnosis target portion that is a portion where the damage state is to be diagnosed; a step of designating, in the image, a reference portion that is a portion without the damage state; a step of individually calculating L*a*b* values of the diagnosis target portion and the reference portion; a step of calculating a color difference between the L*a*b* values of the diagnosis target portion and the L*a*b* values of the reference portion; and a step of diagnosing the damage state of the diagnosis target portion from the color difference.

Advantageous Effects of Invention

The diagnosis method, the diagnosis device, and the program described above can quantitatively diagnose a damage to the TBC.

DESCRIPTION OF EMBODIMENTS

Embodiments

A diagnosis system according to the present disclosure will be described below with reference to FIGS. 1 to 5. In the following description, configurations having the same or similar functions are denoted by the same reference signs. Redundant descriptions for these configurations may be omitted.

System Configuration

Figure 1:
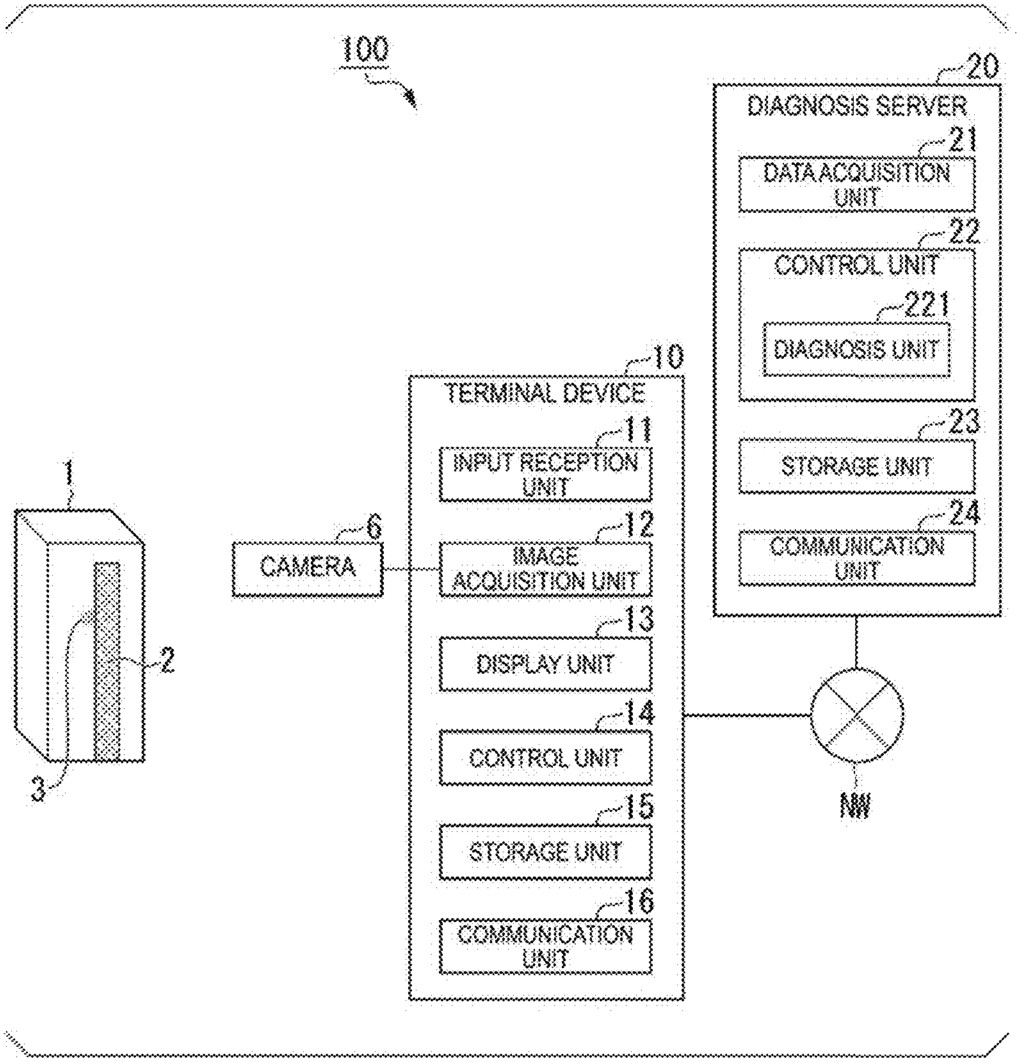
FIG. 1 is a block diagram illustrating an example of a diagnosis system according to an embodiment.

FIG. 1 is a block diagram illustrating an example of a diagnosis system according to an embodiment.

A diagnosis system 100 is a system for diagnosing whether a TBC damage (for example, chipping of the TBC) is present at a TBC-applied article. As illustrated in the drawing, the diagnosis system 100 includes a camera 6, a terminal device 10, and a diagnosis server 20. The camera 6 and the terminal device 10 are communicably connected to each other, and the terminal device 10 and the diagnosis server 20 are communicably connected to each other by using a network NW.

The camera 6 captures an image of a member 1 such as a rotor blade to which the TBC is applied. The image captured by the camera 6 is transmitted to the terminal device 10. For example, a groove 2 is formed at the member 1. When the TBC is applied to the entire surface of the member 1, the TBC damage may occur, for example, near an edge of the groove 2. A suspected damaged portion 3 illustrated in the drawing is, for example, a portion that is suspected to have the TBC damage through visual inspection by an inspector. In the related art, whether the suspected damaged portion 3 has the TBC damage is determined through evaluation by an inspector. However, in the present embodiment, whether the suspected damaged portion 3 has the TBC damage is determined by analyzing the image captured by the camera 6.

Configuration and Function of Terminal Device

The terminal device 10 is a terminal device such as a personal computer (PC), a smartphone, or a tablet. The terminal device 10 includes an input reception unit 11 including an input device such as a keyboard, a mouse, a touch panel, or a button, an image acquisition unit 12 that acquires an image captured by the camera 6, a display unit 13 including a display device such as a liquid crystal display, a control unit 14 that controls the operation of the terminal device 10, a storage unit 15 including a storage device such as a hard disk drive (HDD) or a flash memory and storing various data, and a communication unit 16 including a communication module and communicating with another device.

Figure 3:
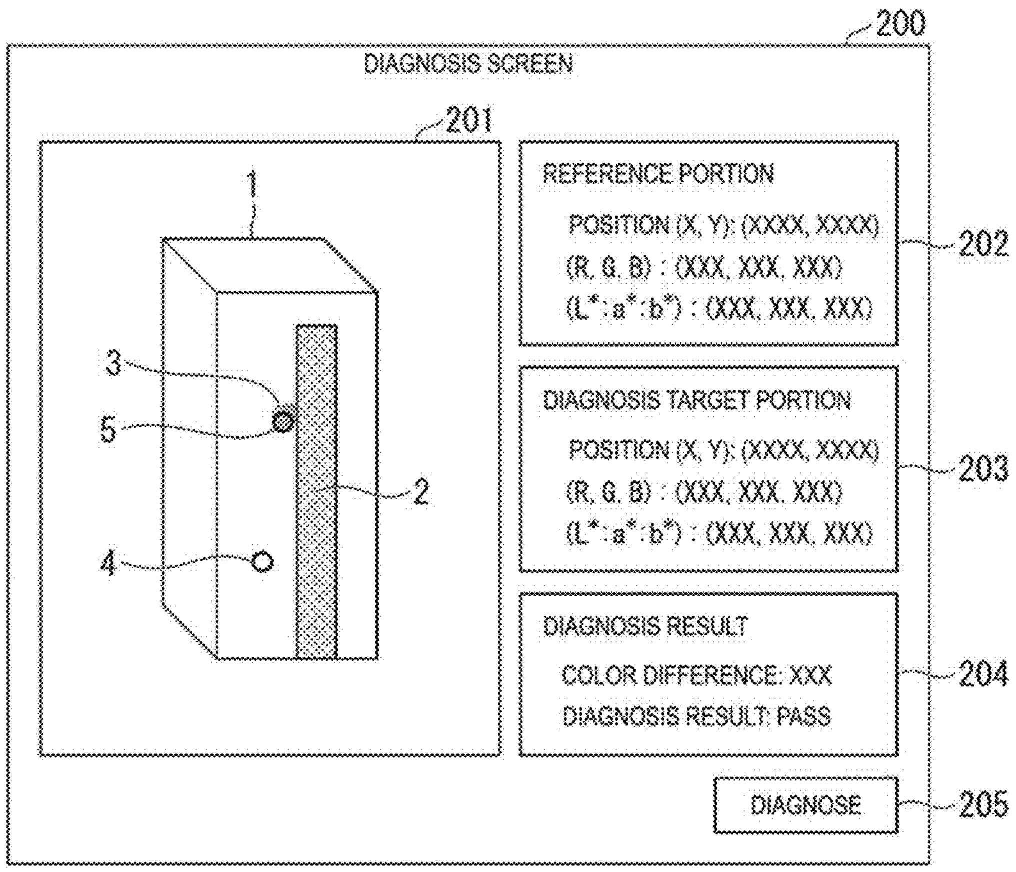
FIG. 3 is a diagram illustrating an example of a diagnosis screen according to the embodiment.

For example, the input reception unit 11 receives the setting of a reference portion 4 and a diagnosis target portion 5 by an inspector with respect to an image of the member 1 displayed on a diagnosis screen 200 illustrated in FIG. 3. The reference portion 4 is a portion where the TBC damage is obviously not present as seen by the inspector. The diagnosis target portion 5 is a portion where the TBC damage is suspected as seen by the inspector, and is a portion subjected to TBC damage determination. For example, the inspector sets the diagnosis target portion 5 so as to include the suspected damaged portion 3. The input reception unit 11 receives operation, such as touching or selecting by the inspector, on a diagnosis button 205 of the diagnosis screen 200. As will be described below, when the diagnosis button 205 is selected, diagnosing whether the TBC damage has occurred in the diagnosis target portion 5 is executed.

The control unit 14 communicates with the diagnosis server 20 by using the communication unit 16 and executes a diagnosis processing for the TBC damage. For example, the control unit 14 transmits an image acquired by the image acquisition unit 12 to the diagnosis server 20 using the communication unit 16. The control unit 14 receives the diagnosis screen 200 on which the image of the member 1 is displayed from the diagnosis server 20 using the communication unit 16 and displays the diagnosis screen 200 on the display unit 13. When the input reception unit 11 receives the setting of the reference portion 4 and the diagnosis target portion 5, the control unit 14 calculates coordinate information of these portions and transmits the calculated coordinate information of the reference portion and the diagnosis target portion to the diagnosis server 20 using the communication unit 16. When the diagnosis button 205 is touched or the like, the control unit 14 requests the diagnosis server 20 to diagnose whether the diagnosis target portion 5 has the TBC damage and receives the diagnosis screen 200 including the diagnosis result from the diagnosis server 20 by using the communication unit 16, and displays the diagnosis screen on the display unit 13.

Configuration and Function of Server Device

The diagnosis server 20 includes one or a plurality of computers. The diagnosis server 20 includes a data acquisition unit 21, a control unit 22, a storage unit 23, and a communication unit 24. The data acquisition unit 21 acquires an image obtained by capturing the member 1, the coordinate information of the reference portion 4 and the diagnosis target portion 5, and the like from the terminal device 10 by using the communication unit 24. The control unit 22 controls the operation of the diagnosis server 20. The control unit 22 includes a diagnosis unit 221. Before the TBC damage determination, the diagnosis unit 221 determines whether the reference portion 4 and the diagnosis target portion 5 set by the inspector are appropriate. The diagnosis unit 221 calculates a color difference between the reference portion 4 and the diagnosis target portion 5 in a L*a*b* color space based on the image of the member 1 acquired by the data acquisition unit 21, and determines that the TBC damage has occurred in the diagnosis target portion 5 when the color difference is equal to or greater than a threshold value. The control unit 22 uses the communication unit 24 to transmit, to the terminal device 10, the determination result on whether the reference portion 4 and the diagnosis target portion 5 are appropriate and the diagnosis result on whether the TBC damage has occurred in the diagnosis target portion 5. For example, the control unit 22 may have a web server function, generate the diagnosis screen 200 illustrated in FIG. 3 in a form of a web screen, and transmit the diagnosis screen 200 to the terminal device 10. The storage unit 23 includes a storage device such as a hard disk drive (HDD) or a flash memory and stores various data. The communication unit 24 includes a communication module and communicates with the terminal device 10.

Operation

Figure 2:
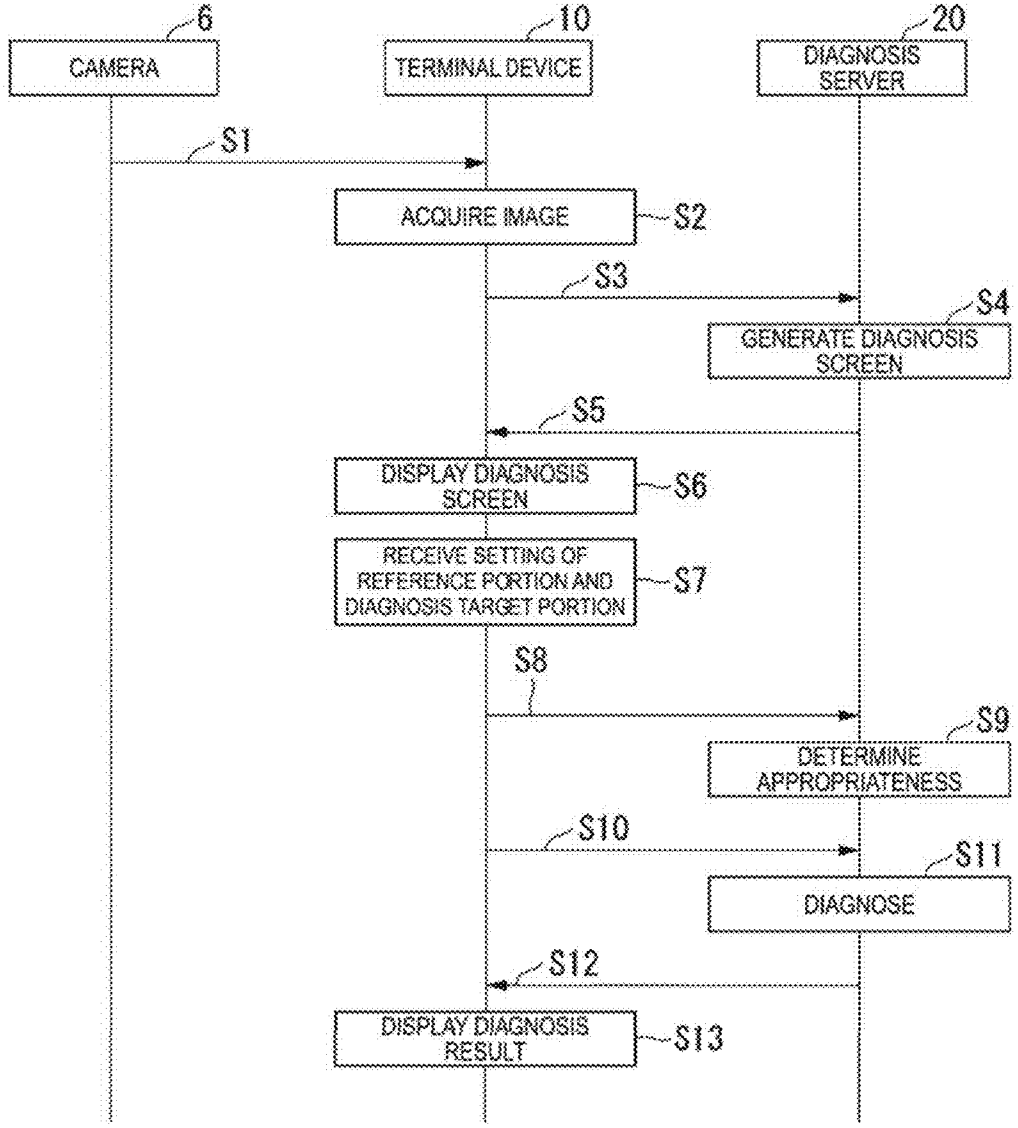
FIG. 2 is a diagram illustrating an example of a flow of an entire diagnosis processing according to the embodiment.

Next, the entire flow of the diagnosis processing for the TBC damage by the diagnosis system 100 will be described with reference to FIGS. 2 and 3. FIG. 2 is a diagram illustrating an example of the entire flow of the diagnosis processing according to the embodiment. First, an inspector operates the camera 6 to capture an image of the member 1 to which the TBC is applied. The camera 6 transmits the captured image to the terminal device 10 (step S1). In the terminal device 10, the image acquisition unit 12 acquires the image (step S2), and the communication unit 16 transmits the acquired image to the diagnosis server 20 in accordance with an instruction from the control unit 14 (step S3). In the diagnosis server 20, the data acquisition unit 21 acquires the image using the communication unit 24 and stores the image in the storage unit 23. The control unit 22 generates the diagnosis screen 200 including the acquired image (step S4). The control unit 22 transmits the diagnosis screen 200 to the terminal device 10 using the communication unit 24 (step S5). In the terminal device 10, the control unit 14 acquires the diagnosis screen 200 using the communication unit 16, and displays the diagnosis screen 200 on, for example, a browser (step S6). Reference is now made to FIG. 3.

FIG. 3 is a diagram illustrating an example of the diagnosis screen according to the embodiment. The diagnosis screen 200 includes an image region 201, a reference portion region 202, a diagnosis target portion region 203, a diagnosis result region 204, and the diagnosis button 205. The image of the member 1 captured by the camera 6 is displayed in the image region 201. The inspector sets the reference portion 4 and the diagnosis target portion 5 in the image region 201. For example, the inspector sets the reference portion 4 by designating, with a mouse or the like, a portion in the image region 201 where the TBC damage is obviously not present. The input reception unit 11 receives this designation operation, and the control unit 14 calculates location information of the designated reference portion 4 (e.g., coordinate information of the reference portion 4 in the image captured by the camera 6). For example, the control unit 14 regards a range of a plurality of pixels including a pixel designated by a user (for example, a total of four pixels including adjacent pixels) as the reference portion 4, and calculates coordinate information defining the range (e.g., coordinate information of each pixel). Similarly, the inspector sets the diagnosis target portion 5 by designating, with a mouse or the like, a portion in the image region 201 (e.g., a part of the suspected damaged portion 3) suspected to have the TBC damage. The input reception unit 11 receives this designation operation, and the control unit 14 calculates location information of the designated diagnosis target portion 5 (e.g., coordinate information of a total of adjacent four pixels including the designated pixel).

In the reference portion region 202, the location information of the reference portion 4 (e.g., X and Y coordinates of the reference portion 4, where a horizontal direction of the image captured by the camera 6 is an X-axis and a vertical direction thereof is a Y-axis), RGB values of the reference portion 4, and L*, a*, and b* values in a Lab color space are displayed.

In the diagnosis target portion region 203, the location information of the diagnosis target portion 5 (e.g., X and Y coordinates of the diagnosis target portion 5, where a horizontal direction of the image captured by the camera 6 is an X-axis and a vertical direction thereof is a Y-axis), RGB values of the diagnosis target portion 5, and L*, a*, and b* values in a L*a*b* color space are displayed.

In the diagnosis result region 204, a color difference ΔE*ab in the L*a*b* color space between the reference portion 4 and the diagnosis target portion 5 and the diagnosis result are displayed. The diagnosis result is whether the diagnosis target portion 5 is a TBC damage portion. In the diagnosis result region 204, "Pass" is displayed when the diagnosis target portion 5 is not the TBC damage portion, and "Fail" is displayed when the diagnosis target portion 5 is the TBC damage portion. When the diagnosis button 205 is selected, diagnosis of the diagnosis target portion 5 is executed.

When the diagnosis screen 200 is displayed (step S6), the inspector sets the reference portion 4 and the diagnosis target portion 5 in the image region 201. The input reception unit 11 receives the setting of these portions (step S7). For example, a portion to be designated first may be defined as the reference portion 4, and a portion to be designated next is defined as the diagnosis target portion 5, and the input reception unit 11 may recognize a pixel clicked first with a mouse as the reference portion 4, and a pixel clicked next with the mouse as the diagnosis target portion 5. The control unit 14 calculates coordinate information of the reference portion 4 and the diagnosis target portion 5 and transmits the coordinate information to the diagnosis server 20 (step S8). In the diagnosis server 20, the data acquisition unit 21 acquires the coordinate information of the reference portion 4 and the diagnosis target portion 5 using the communication unit 24, and the diagnosis unit 221 determines appropriateness (step S9). For example, when a portion where the TBC damage occurs is selected as the reference portion 4, an error occurs in the diagnosis of the diagnosis target portion 5. For example, when a portion (groove 2 or the like) not subjected to TBC application is selected as the diagnosis target portion 5, the TBC damage diagnosis becomes meaningless. In addition, when a distance between the reference portion 4 and the diagnosis target portion 5 is too large, a difference in how the reference portion 4 and the diagnosis target portion 5 are irradiated with light may affect the diagnosis. Thus, the diagnosis unit 221 determines whether each of the reference portion 4 and the diagnosis target portion 5 is appropriate, or whether the reference portion 4 and the diagnosis target portion 5 are too far away from each other. When at least one of the reference portion 4 or the diagnosis target portion 5 is not an appropriate portion or when the distance between the reference portion 4 and the diagnosis target portion 5 is too large, a warning is given and the processing of steps S7 to S9 is executed again. When the processing of step S9 is executed, the diagnosis unit 221 calculates the RGB values and the L*a*b* values of the reference portion 4 and the diagnosis target portion 5, and the control unit 22 reflects these values in the reference portion region 202 and the diagnosis target portion region 203 of the diagnosis screen 200 each time to update the display of the diagnosis screen 200. When both the reference portion 4 and the diagnosis target portion 5 are determined to be appropriate, the inspector selects the diagnosis button 205. The input reception unit 11 receives this selection. The control unit 14 uses the communication unit 16 to request the diagnosis server 20 to perform the diagnosis (step S10). In the diagnosis server 20, the diagnosis unit 221 diagnoses whether the TBC damage has occurred in the diagnosis target portion 5 (step S11). The diagnosis server 20 transmits the diagnosis result to the terminal device 10 (step S12), and the terminal device 10 displays the diagnosis result (step S13). Specifically, in the diagnosis server 20, the control unit 22 updates the display of the diagnosis screen 200 by reflecting the diagnosis result by the diagnosis unit 221 in the diagnosis result region 204 of the diagnosis screen 200. In the terminal device 10, the control unit 14 receives the updated diagnosis screen 200 by using the communication unit 16 and displays the diagnosis screen 200 including the diagnosis result on the display unit 13.

Details of Appropriateness Determination and TBC Damage Diagnosis

Figure 4:
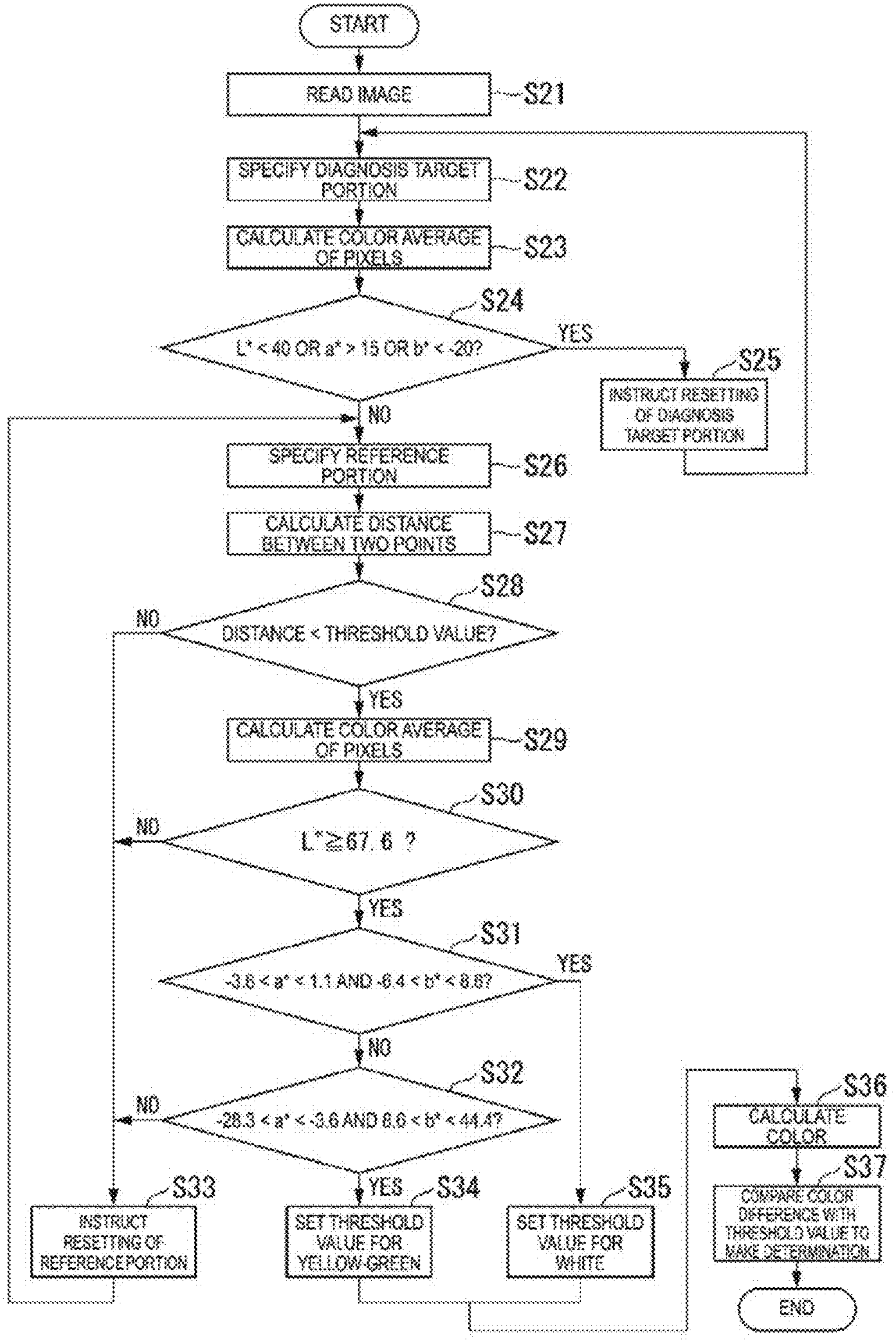
FIG. 4 is a flowchart illustrating an example of a TBC damage diagnosis processing according to the embodiment.

Next, the details of the processing in steps S9 and S11 in FIG. 2 will be described with reference to FIG. 4. It is assumed that the region of the member 1 to which the TBC is applied has a color of white or yellow-green, depending on a production process. First, the diagnosis unit 221 reads the captured image of the member 1 (step S21). Next, the diagnosis unit 221 specifies the diagnosis target portion 5 based on the coordinate information of the diagnosis target portion 5 (step S22). For example, the diagnosis unit 221 specifies a plurality of pixels included in the range of the diagnosis target portion 5. Next, the diagnosis unit 221 calculates the RGB values of pixels included in the diagnosis target portion 5, converts the RGB values into L*a*b* values, and calculates a color average of a plurality of pixels (e.g., four pixels) (step S23). For example, when four pixels arranged in a square shape are specified as the diagnosis target portion 5 and the L*a*b* values of the pixels are pixel 1=(L1, a1, b1), pixel 2=(L2, a2, b2), pixel 3=(L3, a3, b3), and pixel 4=(L4, a4, b4), the diagnosis unit 221 calculates the average of the L* values for L* by (L1+L2+L3+L4)/4. The same applies to the a* values and the b* values. In this way, the diagnosis unit 221 calculates the averages of the L*a*b* values for the diagnosis target portion 5. Next, the diagnosis unit 221 determines whether any one of the conditions of $L^*<40$, $a^*<15$, and $b^*<-20$ is satisfied for each of the calculated averages of the $L^*a^*b^*$ values (step S24). In step S24, whether the diagnosis target portion 5 is appropriate is determined. When any of the conditions is satisfied (step S24; Yes), the diagnosis unit 221 determines that the set diagnosis target portion 5 is not appropriate, and requests resetting of the diagnosis target portion 5 (step S25). For example, the diagnosis unit 221 displays a message such as "The diagnosis target portion 5 is not appropriate. Please reset the diagnosis target portion 5" on the diagnosis screen 200. The inspector resets the diagnosis target portion 5. When the inspector resets the diagnosis target portion 5, the terminal device 10 calculates coordinate information of the diagnosis target portion 5 and transmits the coordinate information to the diagnosis server 20. The processing in steps S22 to S25 is repeated until the diagnosis target portion 5 is determined to be appropriate (until the determination in step S24 becomes No).

When none of the averages of the $L^*a^*b^*$ values calculated for each of the pixels included in the range of the diagnosis target portion 5 satisfies any of the conditions of $L^*<40$, $a^*<15$, and $b^*<-20$ (step S24: No), the diagnosis unit 221 determines that the diagnosis target portion 5 is appropriate, and then specifies the reference portion 4 based on the coordinate information of the reference portion 4 (step S26). For example, the diagnosis unit 221 specifies pixels included in the range of the reference portion 4. Next, the diagnosis unit 221 calculates a distance between two points (the diagnosis target portion 5 specified in step S22 and the reference portion 4) (step S27). Next, the diagnosis unit 221 determines whether the calculated distance is smaller than a predetermined threshold value (e.g., 50 mm) (step S28). When the distance is equal to or greater than the threshold value (step S28; No), the diagnosis unit 221 requests resetting of the reference portion 4 (step S33). For example, the diagnosis unit 221 displays a message such as "The reference portion 4 is not appropriate. Please reset the reference portion 4" on the diagnosis screen 200.

When the distance is smaller than the threshold value (step S28; Yes), the diagnosis unit 221 calculates the RGB values of pixels included in the reference portion 4, converts the RGB values into $L^*a^*b^*$ values, and calculates a color average of a plurality of pixels (e.g., four pixels) (step S29). Similarly to the case of the diagnosis target portion 5, for example, the diagnosis unit 221 calculates the averages of the $L^*a^*b^*$ values of the pixels included in the range of the reference portion 4 for each of the $L^*a^*b^*$ values. Next, the diagnosis unit 221 determines whether a condition of $L^*\geq 67.7$ is satisfied based on the calculated averages of the $L^*a^*b^*$ values of the pixels (step S30). When this condition is not satisfied (step S30; No), the diagnosis unit 221 requests resetting of the reference portion 4 (step S33).

When the condition of $L^*\geq 67.7$ is satisfied (step S30; Yes), then the diagnosis unit 221 determines whether the calculated averages of the $L^*a^*b^*$ values satisfy $-3.6<a^*<1.1$ and $-6.4<b^*<8.6$ (step S31). When this condition is satisfied (step S31; Yes), the diagnosis unit 221 sets, as a threshold value for a color difference for TBC damage determination, a value for a case where the color of the TBC is white (threshold value for white) (step S35).

When the condition of $-3.6<a^*<1.1$ and $-6.4<b^*<8.6$ is not satisfied (step S31; No), then the diagnosis unit 221 determines whether the calculated averages of the $L^*a^*b^*$ values satisfy $-28.3<a^*<-3.6$ and $8.6<b^*<44.4$ (step S32). When this condition is satisfied (step S32; Yes), the diagnosis unit 221 sets, as a threshold value for a color difference for TBC damage determination, a value for a case where the color of the TBC is yellow-green (threshold value for yellow-green) (step S34).

When the condition of $-28.3<a^*<-3.6$ and $8.6<b^*<44.4$ is not satisfied (step S32; No), the diagnosis unit 221 requests resetting of the reference portion 4 (step S33). The inspector resets the reference portion 4. When the inspector resets the reference portion 4, the terminal device 10 calculates coordinate information of the reference portion 4 and transmits the coordinate information to the diagnosis server 20. The processing in steps S26 to S33 is repeated until the reference portion 4 is determined to be appropriate (until the determination in step S28 becomes Yes, the determination in step S30 becomes Yes, and the determination in step S31 or step S32 becomes Yes).

This is the end of the processing for determining the appropriateness of the reference portion 4 and the diagnosis target portion 5 (corresponding to step S9 in FIG. 2). When the appropriate reference portion 4 and the appropriate diagnosis target portion 5 are set, the diagnosis unit 221 determines whether the diagnosis target portion 5 is a TBC damage portion from a color difference between the reference portion 4 and the diagnosis target portion 5 based on, for example, operation on the diagnosis button 205 by the inspector. The diagnosis unit 221 calculates a color difference between the averages of the $L^*a^*b^*$ values of the reference portion 4 calculated in step S29 and the averages of the $L^*a^*b^*$ values of the diagnosis target portion 5 calculated in step S23 (step S36). A method of calculating the color difference (Euclidean distance based on the difference in $L^*$, the difference in $a^*$, and the difference in $b^*$) is known, and thus the description thereof is omitted. Next, the diagnosis unit 221 compares the threshold value for the color difference set in step S34 or step S35 with the color difference calculated in step S36. When the calculated color difference is equal to or greater than the threshold value, the diagnosis unit 221 determines that the diagnosis target portion 5 is a TBC damage portion (fail), and otherwise determines that the diagnosis target portion 5 is not a TBC damage portion (pass) (step S37).

As described above, according to the present embodiment, whether there is the TBC damage can be automatically and quantitatively determined based on the color difference between the reference portion 4 and the diagnosis target portion 5. Since the diagnosis can be performed without relying on the sense or the subjectivity of an inspector, it is possible to prevent inconsistency in pass/fail determination and increase in costs due to reworking.

In the above description, a distance between the reference portion 4 and the diagnosis target portion 5 is calculated and whether the distance is appropriate is determined (step S28), but this determination may be omitted. Although the example in which the reference portion 4 is reset when the distance between the two points is equal to or greater than the threshold value has been described, the diagnosis target portion 5 may be reset instead of (or in addition to) the reference portion 4.

Figure 5:
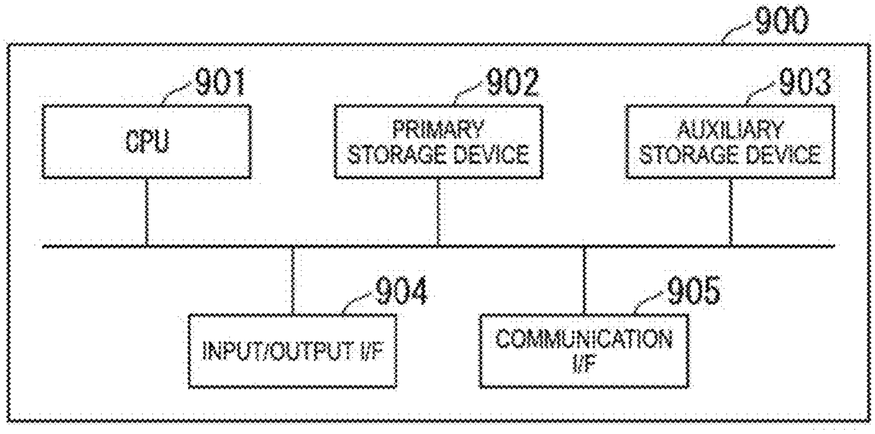
FIG. 5 is a diagram illustrating an example of a hardware configuration of the diagnosis system according to the embodiment.

FIG. 5 is a diagram illustrating an example of a hardware configuration of the diagnosis system according to the embodiment.

A computer 900 includes a CPU 901, a primary storage device 902, an auxiliary storage device 903, an input/output interface 904, and a communication interface 905.

The terminal device 10 and the diagnosis server 20 are implemented in the computer 900. Each of the above-described functions is stored in the auxiliary storage device 903 in a format of a program. The CPU 901 reads the program from the auxiliary storage device 903, loads the program into the primary storage device 902, and executes the above-mentioned processing in accordance with the program. The CPU 901 secures a storage area in the primary storage device 902 in accordance with the program. The CPU 901 secures a storage area for storing data under processing in the auxiliary storage device 903 in accordance with the program.

A program for implementing the whole or part of functions of the terminal device 10 and the diagnosis server 20 may be recorded in a computer readable recording medium, and a computer system may be caused to read and execute the program recorded in the recording medium to execute the processing of respective functional units. The "computer system" here includes hardware such as an operating system (OS) or peripheral equipment. When a WWW system is used, the "computer system" also includes a home page provision environment (or a display environment). The "computer readable recording medium" refers to a portable medium such as a CD, a DVD, or a USB, or a storage device such as a hard disk built in the computer system. When this program is distributed to the computer 900 through a communication line, the computer 900 having received the distribution may load the program into the primary storage device 902 to execute the above-described processing. The above-described program may implement part of the above-described functions and may further implement the above-described functions in combination with a program already recorded in the computer system.

In the foregoing, some embodiments according to the present disclosure have been described, but all of these embodiments are merely illustrative and are not intended to limit the scope of the invention. These embodiments can be implemented in various other forms, and various omissions, substitutions, and changes can be made without departing from the gist of the invention. These embodiments and modifications thereof are included in the scope and gist of the invention and are also included in the scope of the invention described in the claims and the equivalents thereof.

SUPPLEMENTARY NOTES

The diagnosis method, the diagnosis device, and the program described in each embodiment can be understood as follows, for example.

(1) A diagnosis method according to a first aspect is a method for diagnosing a damage state of a coating material (e.g., TBC) coated on a surface of a member. The diagnosis method includes: a step of setting, in an image obtained by capturing the surface of the member, a diagnosis target portion that is a portion where the damage state is to be diagnosed; a step of designating, in the image, a reference portion that is a portion without the damage state; a step of individually calculating L*a*b* values of the diagnosis target portion and the reference portion; a step of calculating a color difference between the L*a*b* values of the diagnosis target portion and the L*a*b* values of the reference portion; and a step of diagnosing the damage state of the diagnosis target portion from the color difference.

Accordingly, the damage to the coating material can be quantitatively diagnosed.

(2) A diagnosis method according to a second aspect is the diagnosis method of (1) and further includes a step of determining whether the diagnosis target portion is appropriate from the L*a*b* values of the diagnosis target portion.

Accordingly, it is possible to determine whether a location set as the diagnosis target portion is appropriate.

(3) A diagnosis method according to a third aspect is the diagnosis method of (1) or (2) and further includes a step of determining whether the reference portion is appropriate from the L*a*b* values of the reference portion.

Accordingly, it is possible to determine whether a location set as the reference portion is appropriate. By correctly setting the reference portion, the damage to the diagnosis target portion can be correctly diagnosed.

(4) A diagnosis method according to a fourth aspect is the diagnosis method according to any one of (1) to (3) and further includes a step of calculating a distance between the diagnosis target portion and the reference portion, and a step of resetting the reference portion or the diagnosis target portion when the distance exceeds a predetermined first threshold value.

When the distance between the reference portion and the diagnosis target portion is too large, accuracy of diagnosis may be reduced due to a difference in how the reference portion and the diagnosis target portion are irradiated with light. The distance between the diagnosis target portion and the reference portion is determined, and when the distance is too large, the reference portion is reset to have an appropriate distance, whereby the accuracy of diagnosis can be maintained.

(5) A diagnosis method according to a fifth aspect is the diagnosis method according to any one of (1) to (4). In the step of diagnosing, the color difference is compared with a second threshold value predetermined according to a color of the coating material, and when the color difference is equal to or greater than the second threshold value, the diagnosis target portion is determined to have a damage to the coating material.

For example, even for the same member, the coating material may be colored in various colors depending on the manufacturing process. The accuracy of diagnosis can be maintained by using a threshold value according to a color of the coating material.

(6) A diagnosis device according to a sixth aspect is a diagnosis device for diagnosing a damage state of a coating material coated on a surface of a member. The diagnosis device includes: a unit configured to set, in an image obtained by capturing the surface of the member, a diagnosis target portion that is a portion where the damage state is to be diagnosed; a unit configured to designate, in the image, a reference portion that is a portion without the damage state; a unit configured to individually calculate L*a*b* values of the diagnosis target portion and the reference portion; a unit configured to calculate a color difference between the L*a*b* values of the diagnosis target portion and the L*a*b* values of the reference portion; and a unit configured to diagnose the damage state of the diagnosis target portion from the color difference.

(7) A program according to a seventh aspect causes a computer to execute a diagnosis processing for diagnosing a damage state of a coating material coated on a surface of a member. The diagnosis processing includes: a step of setting, in an image obtained by capturing the surface of the member, a diagnosis target portion that is a portion where the damage state is to be diagnosed; a step of designating, in the image, a reference portion that is a portion without the damage state; a step of individually calculating L*a*b* values of the diagnosis target portion and the reference portion; a step of calculating a color difference between the L*a*b* values of the diagnosis target portion and the L*a*b* values of the reference portion; and a step of diagnosing the damage state of the diagnosis target portion from the color difference.

INDUSTRIAL APPLICABILITY

According to the diagnosis method, the diagnosis device, and the program described above, a damage to the TBC can be quantitatively diagnosed.

REFERENCE SIGNS LIST

100 Diagnosis system
6 Camera
10 Terminal device
11 Input reception unit
12 Image acquisition unit
13 Display unit
14 Control unit
15 Storage unit
16 Communication unit
20 Diagnosis server
21 Data acquisition unit
22 Control unit
221 Diagnosis unit
23 Storage unit
24 Communication unit
900 Computer
901 CPU
902 Primary storage device
903 Auxiliary storage device
904 Input/output interface
905 Communication interface

The invention claimed is:

1. A diagnosis method for diagnosing a damage state of a coating material coated on a surface of a member, the diagnosis method comprising:
- setting a diagnosis target portion in an image obtained by capturing the surface of the member, the diagnosis target portion being a portion where the damage state is to be diagnosed;
- designating a reference portion in the image, the reference portion being a portion coated with the coating material without the damage state;
- individually calculating L*a*b* values of the diagnosis target portion and the reference portion;
- calculating a color difference between the L*a*b* values of the diagnosis target portion and the L*a*b* values of the reference portion; and
- diagnosing the damage state of the diagnosis target portion from the color difference.

2. The diagnosis method according to claim 1, further comprising determining whether the diagnosis target portion is appropriate from the L*a*b* values of the diagnosis target portion.

3. The diagnosis method according to claim 1, further comprising determining whether the reference portion is appropriate from the L*a*b* values of the reference portion.

4. The diagnosis method according to claim 1, further comprising:
- calculating a distance between the diagnosis target portion and the reference portion; and
- resetting the reference portion or the diagnosis target portion when the distance exceeds a predetermined first threshold value.

5. The diagnosis method according to claim 1, wherein, during the diagnosing, the color difference is compared with a second threshold value predetermined according to a color of the coating material, and when the color difference is equal to or greater than the second threshold value, the diagnosis target portion is determined to have a damage to the coating material.

6. A diagnosis device for diagnosing a damage state of a coating material coated on a surface of a member, the diagnosis device comprising:
- a unit configured to set a diagnosis target portion in an image obtained by capturing the surface of the member, the diagnosis target portion being a portion where the damage state is to be diagnosed;
- a unit configured to designate a reference portion in the image, the reference portion being a portion coated with the coating material without the damage state;
- a unit configured to individually calculate L*a*b* values of the diagnosis target portion and the reference portion;
- a unit configured to calculate a color difference between the L*a*b* values of the diagnosis target portion and the L*a*b* values of the reference portion; and
- a unit configured to diagnose the damage state of the diagnosis target portion from the color difference.

7. A program embodied on a non-transitory computer readable medium and configured to cause a computer to execute a diagnosis processing for diagnosing a damage state of a coating material coated on a surface of a member, the diagnosis processing comprising:
- setting a diagnosis target portion in an image obtained by capturing the surface of the member, the diagnosis target portion being a portion where the damage state is to be diagnosed;
- designating a reference portion in the image, the reference portion being a portion coated with the coating material without the damage state;
- individually calculating L*a*b* values of the diagnosis target portion and the reference portion;
- calculating a color difference between the L*a*b* values of the diagnosis target portion and the L*a*b* values of the reference portion; and
- diagnosing the damage state of the diagnosis target portion from the color difference.

* * * * *